April 5, 1960    J. J. SCHWARTZ    2,932,018
MULTIPLE PURPOSE ELECTRIC LANTERN

Filed May 22, 1957    2 Sheets-Sheet 1

INVENTOR
JOHN J. SCHWARTZ

BY *Vernon A. Fristad*
ATTORNEY

April 5, 1960     J. J. SCHWARTZ     2,932,018
MULTIPLE PURPOSE ELECTRIC LANTERN
Filed May 22, 1957     2 Sheets-Sheet 2

INVENTOR
JOHN J. SCHWARTZ

BY
ATTORNEY

United States Patent Office
2,932,018
Patented Apr. 5, 1960

2,932,018

MULTIPLE PURPOSE ELECTRIC LANTERN

John J. Schwartz, St. Paul, Minn., assignor to Brown & Bigelow, St. Paul, Minn., a corporation of Minnesota Application May 22, 1957, Serial No. 660,783

6 Claims. (Cl. 340—366)

This invention relates to a new and improved portable electric lantern, having a multiplicity of uses, and more particularly to a compact safety light which can be plug-connected into a cigar lighter receptacle on a vehicle. The invention comprehends a light that can be used by a motorist either for emergencies or for general utilitarian purposes. It is equipped with a calibrated clear Fresnel-type lens on one side, and with a red Fresnel-type lens on the other side, and accordingly the invention can be used as a dual-purpose flood light and blinking warning light for emergencies on the highway, or as a steady utility light by the mere positioning of a switch.

Although many devices of a similar nature are now available on the market it has been found that numerous shortcomings exist in other lanterns of various types. For example, those lights equipped with self-contained batteries are unduly heavy and unmanageable, not to mention costly, when replacement of the batteries is considered. Moreover, most prior art lights of the type referred to employ two lamps for the operation of two lenses, thereby necessitating extra expense and duplication of parts; other disadvantages of prior art lights inhere in their structural details as many of them have bulky handles and movable lenses; features which may be desirable for non-vehicle use but which are totally unnecessary so far as the average motorist is concerned.

Further limitations of prior art devices include the provision of an inadequate amount of conductive cord, and conversely an inadequate amount of storage space for the attached cord. Additionally no other lantern, to my knowledge, provides a lantern adapted for use in either a 6 volt or a 12 volt system, by the mere change of lamps, without sacrificing the two state intermittent or steady light switching feature.

Accordingly, it is a broad object of this invention to provide an improved portable electric lantern for use with motor vehicles.

A further object of the present invention is to provide in a portable electric light for use with motor vehicles, a novel electrical circuit that allows either 12 or 6 volt operation, and provides a combination permitting a choice of either a steady or an intermittent signal.

Still another object of the present invention is to provide a new and improved outer housing adapted to store a considerable length of electrical cord.

Another object of the present invention is to provide in a multiple purpose electric lantern designed for use with an automotive vehicle a novel handle that serves as a carrying means, a supporting stand, and as a cover for one end of the housing.

Another object of the present invention is to provide a portable electric light which is easy to manufacture and characterized by a minimum of parts.

Still other and further objects will at once become apparent to those skilled in the art from a consideration of the accompanying drawings in which is shown an embodiment of the invention for purposes of illustration only.

Figure 1:
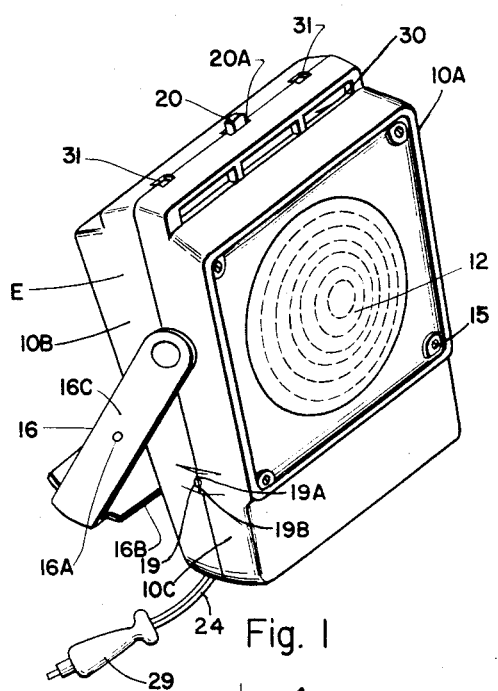
Figure 1 is a perspective view of the multiple purpose electric lantern in its normally operative position.

Referring now to the drawings, Figure 1 portrays an embodiment of the multiple purpose lantern shown as resting upon a relatively flat surface S which may be the ground, a highway or even a picnic table. Such an enumeration, of course, is not intended to be exhaustive as common sense dictates to a large degree the particular resting spot for the light.

Figure 2:
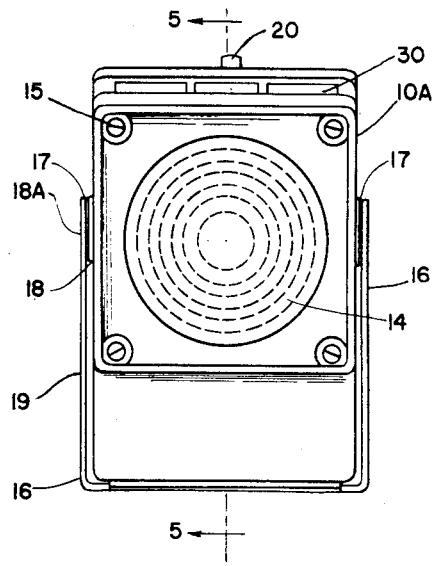
Figure 2 is a front elevational view of the lantern.
Figure 3:
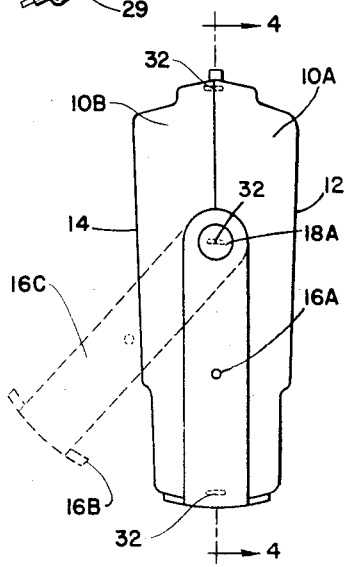
Figure 3 is a side elevational view of the lantern with the handle shown in two positions.
Figure 4:
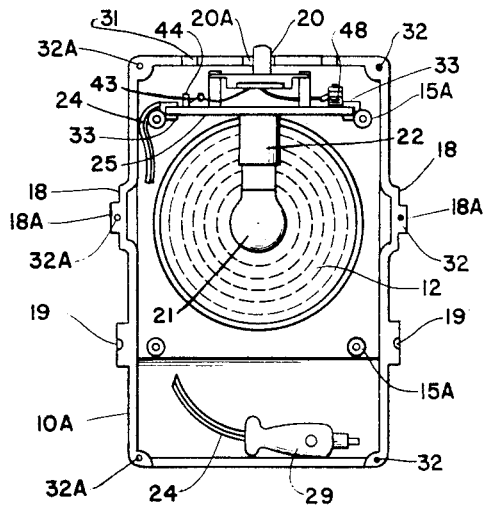
Figure 4 is a cross sectional elevational view taken on the line 4—4 of Figure 3.
Figure 5:
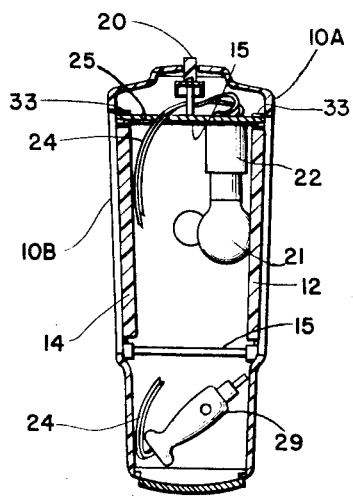
Figure 5 is a cross sectional elevational view taken on the line 5—5 of Figure 4.

The structural details of the device are more clearly illustrated in Figures 2–5. As shown, the light is characterized by an outer shell E formed of two identical mating sections 10a and 10b and having an opening at the bottom. Shell E is preferably fabricated of a synthetic plastic material such as polystyrene, although other suitable materials such as light gauge metal and the like may be used. When molded of plastic materials, the mating portions 10a and 10b are preferably equipped with pins 32 formed integrally with the shell E. The pins 32, which serve to align the two sections 10a and 10b, fit into holes 32a located on corresponding points of the mating parts as shown in Figures 3 and 4. Mating sections 10a and 10b are secured together by four bolts 15 which extend through both sections as shown in Figures 2 and 5. Projection lugs 15a molded on the inside sections 10a and 10b have clearance holes for bolts 15 and provide reinforcing for the shell E.

The lens 12, located on the section 10a is of the Fresnel type and is preferably red-wine in color, similar to the standard traffic signal lights. When the lantern is used by a motorist for emergency roadside repairs, the light emitted through this lens serves to convey a warning signal to approaching vehicles. When employed in this manner the red signal can be used in lieu of a burning flare, or similar warning device, to indicate the presence of an immobile vehicle. A red signal is commonly recognized as an indication of a dangerous or emergency condition, and the device will therefore tend to protect the occupants of the parked automobile. While the device is thus providing a warning signal, the light emitted through the opposite clear lens can be utilized for illuminating the vehicle to permit the making of necessary repairs. A blinking warning signal is particularly effective to indicate the existence of an emergency condition, and is so recognized by motorists. Therefore when the device is set to provide an intermittent signal, the flashing signal acts as a very effective warning device, and serves as a safety precaution for the occupants of the stopped vehicle.

The lens 14, also of the Fresnel type, is a clear lens with a fixed prismatic angle and a calibrated refraction index. The lamp 21 is mounted nearer the colored lens 12 and is therefore set at the proper focal length from the clear lens 14. As shown in the drawings, clear lens 14 is attached to the opposite section 10b of the lantern. Both lenses are heat sealed into their positions by methods well known to those skilled in the art, and are preferably formed of Plexiglas or other non-breakable translucent material.

The legs 16c of handle 16 are pivotally mounted upon shoulder bosses 18 and cylindrically shaped lugs 18a formed into the side of shell E. Washers 17 mounted between bosses 18 and the inner surface of legs 16c frictionally restrain handle 16 when it is rotated about lugs 18a. Handle 16 is preferably fabricated of aluminum sheet stock in such a manner as to yieldably engage bosses 18. This can be done by bending legs 16c inwardly from a normally perpendicular relation to bottom member 16b. Bottom member 16b of handle 16 is shaped to conform to the opening the bottom of shell E and thus serves to enclose the same when handle 16 is rotated into register with the side panels of shell E. To secure handle 16 in its normally closed position, legs 16c are provided with indentations 16a which protrude inwardly from the inner surface thereof. Formed integrally with side panels 10c are raised portions 19 having inclined surfaces joining together at ridge 19a. In the center of ridge 19a a shallow depression 19b is formed to frictionally engage indentations 16a of leg 16c. Handle 16 is yieldably restrained in a normally closed position to provide a cover for the open cavity in the bottom of shell E.

U-shaped lugs 33 formed into sections 10a and 10b of shell E serve as supporting members for the component mounting board 25. As can be seen all of the electrical components except the lamp socket 22 and lamp 21 are mounted on the top side of board 25. Switch 20 extends through aperture 20a in the top of shell E to allow convenient selection of an intermittent or steady light. The remaining electrical components are more fully described hereinafter with the aid of the circuit diagram of Figure 6.

Lantern ventilation is accomplished through the open bottom and the slots 30 located along the top of the vertical face of sections 10a and 10b together with the apertures 31 in the top of shell E. It will be apparent that when the lantern is in use, the handle 16 will normally be moved from its closed position thereby leaving an open bottom in the lantern. Heat generated within the lantern, by the lamp 21 and the bimetallic element, will be dissipated through the slots 30 and 31 and a chimney action will be established with the bottom of the lantern in an open position. The particular construction of the device thus permits the heat to be quickly and efficiently dissipated.

Figure 6:
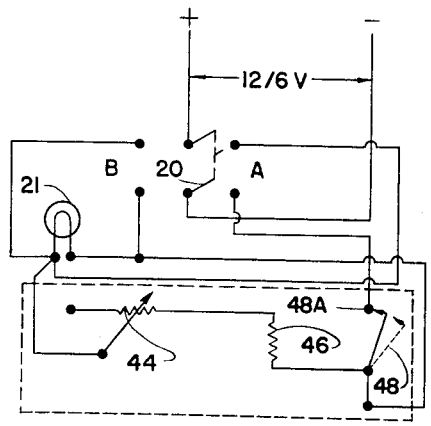
Figure 6 is the electrical circuit diagram for the lantern.

The circuit diagram shown in Figure 6 illustrates the manner in which the lantern is caused to function either as a steady light or as a blinking signal with particular reference to the adaptability of either a 6 or 12 volt lamp. Lamp interchangeability is important since most of today's motor vehicles are equipped with either a 12 or 6 volt ignition system, the current trend being toward the 12 volt system. The area enclosed within the dotted lines is the "blinker" portion of the circuit.

It should be noted that an off-on switch is not shown in the accompanying circuit, the switch 20 being used as a means for selecting either a steady or flashing light. Although it is believed that an on-off switch is an unnecessary refinement for an article of this type, no limitation in this regard is contemplated within the scope of the invention. With the switch in the "A" position, shown in the circuit diagram of Figure 6, the device is connected for 12 volt operation and will provide an intermittent signal. Switch 20, of the double-pole double-throw type, closes the circuit between the contacts on the "A" side thereof, thus allowing a portion of the current to go through variable resistor 44. For 12 volt operation resistor 44 is positioned to allow all of the diverted current to pass therethrough thus reducing the current in resistance 46 to the equivalent of that produced by 6 volts. The balance of the current travels through lamp 21 to switch 48 which is comprised of a bimetallic strip having resistance 46 wound therearound. The current passing through resistance 46 causes the bimetallic strip of switch 48 to expand thus separating it from post 48a of switch 48. This is schematically shown in the circuit diagram through the use of two strips, the solid line strip indicating a closed switch position while the strip shown in dotted lines represents the switch in an open position. It can be seen that the current flow is interrupted during the interval of time required for the cooling of bimetallic strip 48a, causing it to contract and again come into contact with post 48a. The cycle of expansion and contraction of the bimetallic strip caused by the heating and cooling thereof and induced by the flow of current through resistance 46 is repeated continually to provide an intermittent flashing of bulb 21.

For 6 volt operation variable resistor 44 is positioned to allow the current to flow directly to resistance 46.

When a steady state uninterrupted light is desired, switch 20 is positioned so that the contacts on the "B" side thereof are closed, thus bypassing the blinker circuit entirely. It should be noted that either a 12 or a 6 volt damp is required according to the voltage rating of the battery used in the vehicle. Once the voltage of the bulb is determined, resistor 44 can be set for the correct voltage and allowed to remain in that position until a different voltage is required, as in the case of the purchase of a vehicle having a higher voltage battery.

As shown in Figure 5, lamp 21 is located closer to colored lens 12 than to clear lens 14. As previously pointed out, the lamp 21 is located at a proper distance from the clear lens 14, the focal length of the lens 14 having been considered. The selected refraction index and prismatic angles of the clear lens combine to provide a generous flood light at close range together with a spot light effective for distances approximating 100 feet, thereby enabling the user to employ the device as a spot light for ascertaining house numbers on homes which are set back a considerable distance from the street or other similar thoroughfare.

Figure 7:
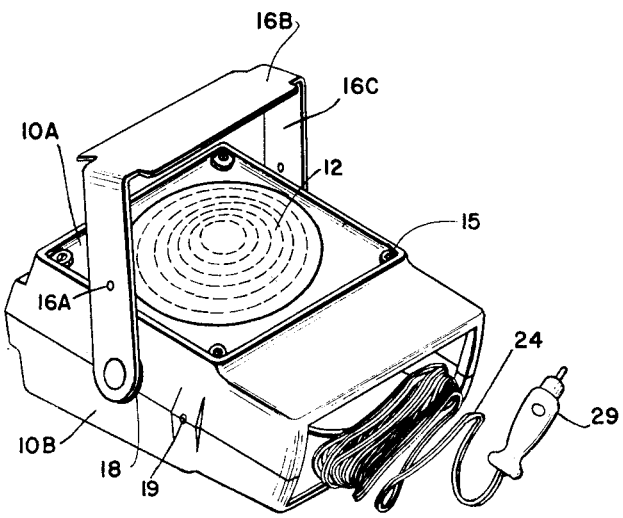
Figure 7 is a perspective view of the lantern illustrating the cord storage and handle features.

The conductor storage capacity of the light is shown clearly in Figure 7 which also illustrates handle 16 positioned for use as a handle.

Thus it can be seen that this invention provides a new and improved type of portable automobile light; one that requires no self-contained batteries and yet is capable of storing approximately twenty-five feet of conductive cord compactly within its housing. It will be apparent from the above discussion and consideration of the attached drawings that a novel trouble light has been provided that is extremely simple, highly efficient in operation, and which permits rapid changeover to meet varying circumstances.

It will, of course, be understood that the enumerated details of construction may be varied throughout a wide range from the principles of this invention and it is, therefore, not proposed to limit the patent granted hereon other than by the scope of the appended claims.

I claim:
1. A portable electric lantern comprising in combination, a housing having a louvered ventilator on the top surface and a substantially open bottom to permit an air stream to circulate through said housing; and a pair of oppositely disposed planar panels, each panel having a cylindrical aperture disposed therein, a lens affixed to each of said planar panels and covering said apertures, an electric lamp within said housing suspended in spaced relationship between said lenses for casting illumination through each of said lenses, circuit means in said housing connected to said lamp and having first switching means for passing a steady flow of electrical energy through said lamp and second switching means having a bi-metallic member for passing an intermittent flow of electrical energy through said lamp, an electrical cord for supplying electric current to said circuit means and said lamp, said cord being housed in said open bottom surface of said housing, when not in use and a resilient U-shaped handle having a pair of depending legs and an arcuate base portion positioned therebetween, said handle being pivotally joined to said housing and rotatable thereabout, the depending legs of said handle frictionally engaging the sides of said housing for positioning the arcuate base portion over the open bottom surface of said housing for storing said cord.

2. A portable electric lantern comprising a housing of thermoplastic material having a pair of oppositely disposed lenses integrally sealed therein, a louvered ventilator on the top surface thereof and a substantially open bottom surface for allowing a stream of air to pass through said housing, electric circuit and lamp means suspended within said housing between the lenses for casting illumination therethrough, support means rotatably joined to the housing for rotation therearound, said support means consisting of parallel leg members, one extending along each side of said housing and joined at their outer ends by a transverse arcuate member of substantially the same size as the open bottom of said housing for supporting said lantern at an angle when in use and for closing the open bottom when not in use.

3. A portable electric lantern comprising a housing having front and rear panels, said housing having a ventilator at the top surface thereof and an open bottom to permit an air stream to pass therethrough; a pair of oppositely disposed lenses secured respectively to the front and rear panels of said housing, one of said lenses being colored and the other being clear; a single electric lamp suspended from the top portion of said housing within the cooling air stream, said lamp being disposed at a fixed focal distance from the clear lens and in close spaced relation to the colored lens for casting a focused beam of light from the clear lens and a diffused beam of light from the colored lens.

4. An electric lantern comprising a housing having a louvered ventilator at the top surface thereof and a substantially open bottom for allowing a current of air to pass therethrough; a planar supporting plate disposed in spaced relation from the top of said housing and having a plurality of apertures therein for allowing the air currents to pass therethrough; an electric lamp suspended from said plate within the path of the air currents, an electric circuit for said lamp positioned on the upper surface of said plate adjacent the apertures, said circuit having a manually operative resistor to adapt said circuit to a supply of electric current of different rated voltages, said circuit consisting of a first branch providing a continuous flow of electric current to said lamp and a second branch having a bi-metallic element for providing an intermittent flow of electric current to said lamp, the first and second branches being controlled by a manually operated switch, and an electric cord for connecting said electric circuit to a supply source.

5. A portable electric lantern comprising in combination, a thermoplastic housing having front and rear panels, each of the panels having a lens secured therein, the lenses being oppositely disposed from each other, said housing having a ventilator at the top and a substantially open bottom for allowing an air current to pass therethrough; a single electric lamp suspended within said housing for exposure to the air currents and disposed at a fixed focal length from one of the lenses for casting a focused beam of light therefrom and disposed in close spaced relation to the opposite lens for casting a diffused beam of light therefrom; a first electric circuit for supplying a continuous flow of electric current to said lamp and a second electric circuit having a bimetallic element for supplying an intermittent flow of current to said lamp, both circuits connected to a resistor for connecting the same to a supply system of various voltage levels; and a support member rotatably joined to the sides of said housing for rotation therearound, said support member consisting of parallel leg members, one extending along each side of said housing and joined at their outer ends by a transverse arcuate member of substantially the same size as the open bottom of said housing for supporting said lantern at an angle when in use and for enclosing the open bottom when not in use.

6. A portable safety lantern for use in a motor vehicle comprising a housing having a first shell with a clear lens disposed in the face thereof, a second shell attachable to the first shell with a colored lens disposed in the face thereof opposite the lens in the first shell, said housing having ventilator means at the top surface thereof and a substantially open bottom surface forming a conduit for cooling air; electric circuit means including a single electric lamp disposed in the upper portion of said housing in the path of the air passing therethrough, said lamp casting continuous or intermittent illumination through the lenses in said housing; a supporting member rotatably joined to the sides of said housing having depending legs, one extending along each side of said housing, the outer ends of the legs being joined by a transverse arcuate plate of substantially the same size as the open bottom of said housing, said supporting member being adapted to support said lantern at an angle when in use and to close the bottom when not in use upon rotation of said supporting member; and an electric cord adapted to connect said circuit means to the electrical system of a motor vehicle, said cord extending out from the open bottom of said housing when the lantern is in use and foldable within the open bottom closed by the arcuate plate of said supporting member when the lantern is not in use.

References Cited in the file of this patent

UNITED STATES PATENTS

| 2,165,562 | Mack et al. | July 11, 1939 |
| 2,564,145 | Beall et al. | Aug. 14, 1951 |
| 2,589,747 | Tedeschi | May 18, 1952 |
| 2,597,705 | Clines | May 20, 1952 |
| 2,638,584 | Fortney | May 12, 1953 |
| 2,666,870 | Levy | Jan. 19, 1954 |
| 2,679,635 | Hart | May 25, 1954 |
| 2,684,476 | Trempe | July 20, 1954 |
| 2,755,373 | Berry | July 17, 1956 |

FOREIGN PATENTS

| 627,652 | France | June 13, 1927 |